(12) United States Patent
Aleksic

(10) Patent No.: US 6,704,022 B1
(45) Date of Patent: Mar. 9, 2004

(54) SYSTEM FOR ACCESSING GRAPHICS DATA FROM MEMORY AND METHOD THEREOF

(75) Inventor: Milivoje M. Aleksic, Richmond Hill (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/512,928

(22) Filed: Feb. 25, 2000

(51) Int. Cl.[7] .................................................. G09T 9/00
(52) U.S. Cl. ........................ 345/555; 345/519; 382/233
(58) Field of Search .................................. 345/555, 519, 345/520, 558, 560, 530, 545, 600, 604, 603, 605; 382/232, 233, 235, 244; 358/1.15–1.17

(56) References Cited

U.S. PATENT DOCUMENTS

| | | | | | |
|---|---|---|---|---|---|
| 4,125,873 | A | * | 11/1978 | Chesarek | ..................... 345/555 |
| 5,999,710 | A | * | 12/1999 | Smith et al. | ............... 358/1.15 |
| 6,020,975 | A | * | 2/2000 | Chen et al. | ................ 358/1.16 |
| 6,031,624 | A | * | 2/2000 | Murphy | ..................... 358/1.17 |
| 6,145,069 | A | * | 11/2000 | Dye | ............................ 345/531 |
| 6,263,413 | B1 | * | 7/2001 | Motomura et al. | ......... 711/173 |
| 6,300,885 | B1 | * | 10/2001 | Davenport et al. | ........... 341/50 |
| 6,366,289 | B1 | * | 4/2002 | Johns | ......................... 345/543 |
| 6,407,741 | B1 | * | 6/2002 | Morein et al. | .............. 345/555 |

* cited by examiner

*Primary Examiner*—Kee M. Tung
(74) *Attorney, Agent, or Firm*—Vedder, Price, Kaufman & Kammholz, P.C.

(57) ABSTRACT

In a specific embodiment of the present invention RGB video data is converted to a YUV video data representation. The YUV video data is compressed and transmitted over a data bus to a memory device. Also transmitted is a compression indicator. The memory device buffers arid decompresses the compressed data. The decompressed data is converted back into uncompressed RGB video, and stored in a memory array. During a read cycle, the RGB data is converted into YUV video data, and compressed at the memory before being transmitted to the graphics processor along with a compression indicator. The graphics processor decompresses the data and provides it to the requesting client.

4 Claims, 6 Drawing Sheets

SYSTEM FOR ACCESSING GRAPHICS DATA FROM MEMORY AND METHOD THEREOF

FIELD OF THE INVENTION

The present invention relates generally to accessing data, and specifically to accessing video data with compression and decompression.

BACKGROUND OF THE INVENTION

The demand for higher graphics resolution and faster graphics speed results in increased amounts of video data being accessed by graphics processors responsible for processing graphic images. The rate at which graphics processors access video data is generally limited by the speed at which memory devices can be accessed, and by the number of bits of data that can be accessed during a specific access cycle.

Therefore, it would be desirable to have a system and/or method capable of accessing graphics data at an increased rate.

DETAILED DESCRIPTION OF THE DRAWINGS

In a specific embodiment of the present invention, RGB (Red Blue Green) video data is converted to a representation YUV video data. The YUV video data is compressed and transmitted over a data bus to a memory device. An indicator of the level of compression of the transmitted data is also transmitted. The memory device buffers and decompresses the compressed data. The decompressed data is converted into RGB video, and stored in a memory array. During a read cycle, the RGB data is received from the memory array, converted into YUV video data, compressed,; and transmitted to the graphics processor 10 along with an indication of compression level.

Figure 1:
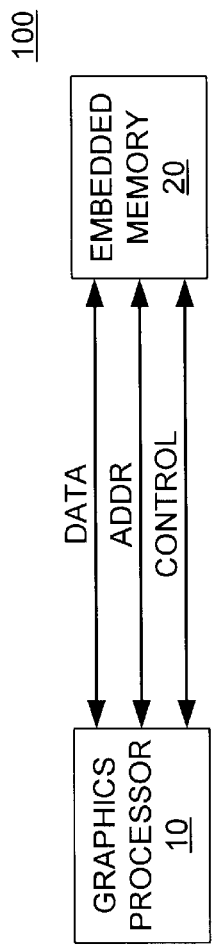
FIG. 1 illustrates, in block diagram form, a system in accordance with the present invention.

The present invention is best understood with reference to specific embodiments illustrated in FIGS. 1 through 8. FIG. 1 illustrates the present invention at its simplest level, which includes a graphics processor 10 connected to a memory 20. Specifically, a data bus (DATA), address bus (ADDR), and control bus (CONTROL) connect graphics processor 10 to the embedded memory 20.

In operation, data written by the graphics processor 10 is first compressed before being transmitted to the embedded memory 20. The compressed data is transmitted over the data bus, and received by the memory 20. Prior to saving the transmitted data at the indicated address, the memory 20 will decompress the data. The compressed data is then stored in a memory array associated with the memory 20 subsequent to decompression.

Figure 2:
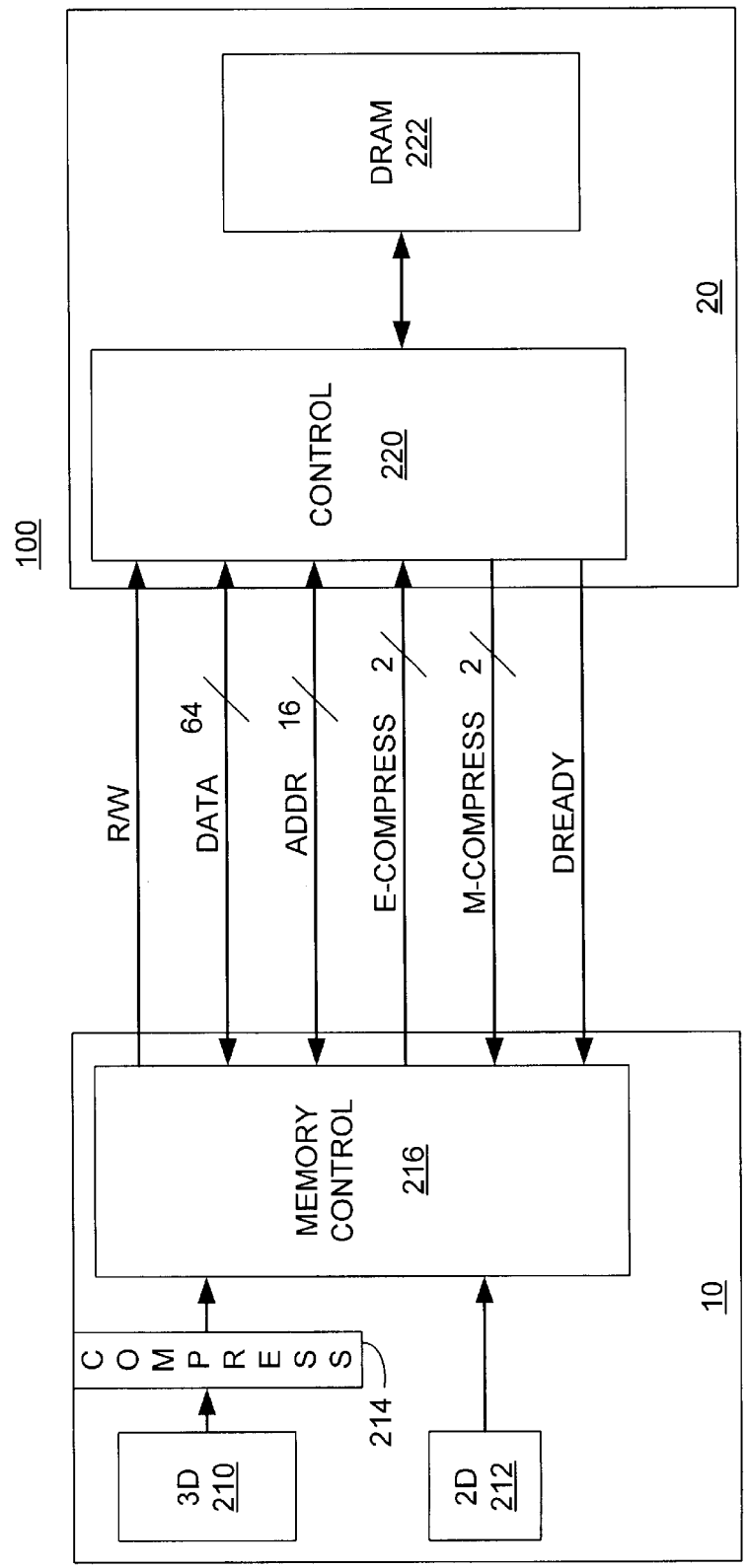
FIG. 2 illustrates, in block diagram form, the system of FIG. 1 in greater detail.

FIG. 2 illustrates the system of FIG. 100 in greater detail. The graphics processor 10 is illustrated to include a three dimensional graphics engine 210, two-dimensional graphics engine 212, compression portion 214, and memory control 216. The three-dimensional graphics engine 210 has an output port having a plurality of nodes. The output port of the graphics engine 210 is connected to an input port of the compression portion 214. The compression portion 214 has an output port connected to the memory controller 216. Furthermore, the memory controller 216 has an input port coupled to an output port of the two-dimensional graphics engine 212.

In the specific embodiment illustrated in FIG. 2, only the three-dimensional graphics engine 210 provides data to the compression portion 214. Generally, the three-dimensional graphics engine 210 is responsible for handling a greater amount of graphics data than the two dimensional graphics engine, and thereby provides the greatest burden in terms of data bandwidth to the overall system 100. In an alternate embodiment, the two-dimensional graphics engine 212 can utilize compression techniques discussed herein.

During a write cycle, a request from one or more three-dimensional graphics engine 210 clients (not shown) will request specific video data be stored in the embedded memory 20. In response to the write request, the data will be provided to the compression portion 214. Note that the data can be provided to the portion 214 under control of memory controller 216, and/or an arbiter (not shown).

When the data being written is RGB data, the compression portion 214 will convert the RGB data into a YUV data representation. Specifically, the data is converted using the following equations:

$$Y=G;$$
$$U=R-G;$$
$$V=B-G.$$

Greater compression efficiency is achievable by performing the RGB to YUV conversion prior to compressing the video data. The compression portion 214 further compresses the data, using any conventional or proprietary compression routines, and can select among numerous compression protocols to provide the most efficient compression available. Based upon the compression level, a final compression ratio will be indicated. In one embodiment, the compression ratio will be one of 1:1; 2:1, 4:1, 8:1, or 16:1. The achieved compression ratio can be stored in register associated with the graphics processor 10.

In a specific embodiment, the compression portion 214 will receive and compress an entire block of data. For example, a block of data can be up to 1024 bits of data in a specific embodiment. Therefore, the number of compressed bits of data to be transmitted over the bus between the graphics processor 10 and the embedded memory will range from the full 1024 bits of data (1:1 compression) to 64 bits (16:1 compression) based upon the final compression ratio. The graphics processor's memory controller 216 will provide the data, address, and control information to the embedded memory 20 upon receiving the compressed data from the compression portion 214.

The control bus illustrated in FIG. 2 includes nodes for a read/write (R/W) indicator, a data ready (DREADY)

indicator, a compression ratio from the graphics processor 10 (E_COMPRESS), and a compression ratio from the memory 20 (M-COMPRESS). The R/W indicator specifies whether a read or a write operation is to occur, and is transmitted from the graphics processor 10 to the memory 20. The data ready indicator (DREADY) indicates when data being read from the memory is available for transmission over the data bus. The E_COMPRESS signal provides information concerning the compression ratio of data being transmitted from the graphics processor 10 to the memory 20. The M_COMPRESS signal provides information concerning the compression ratio of data sent from the memory 20 to the graphics processor 10.

The memory 20 is illustrated to be an embedded memory in that it has logic for performing operations not generally associated with storing data in a memory array. The memory array 222 is illustrated to be a Dynamic Random Access Memory (DRAM). However, other types of memory can be used, including the memory type described with reference to FIG. 8. The data bus, address bus, and control bus are connected to the control module 220. The control module is connected to the memory array 222.

In operation, the control module 220 receives the compressed data at a data port having a plurality of nodes. The compressed data is decompressed based upon the value of the E_COMPRESS signal. In a specific embodiment, the uncompressed data is further converted from YUV data space to RGB data space in a manner using the following equations:

$$R=U+G$$
$$G=Y;$$
$$B=V+G.$$

The uncompressed data is subsequently stored within the memory array 222.

Figure 3:
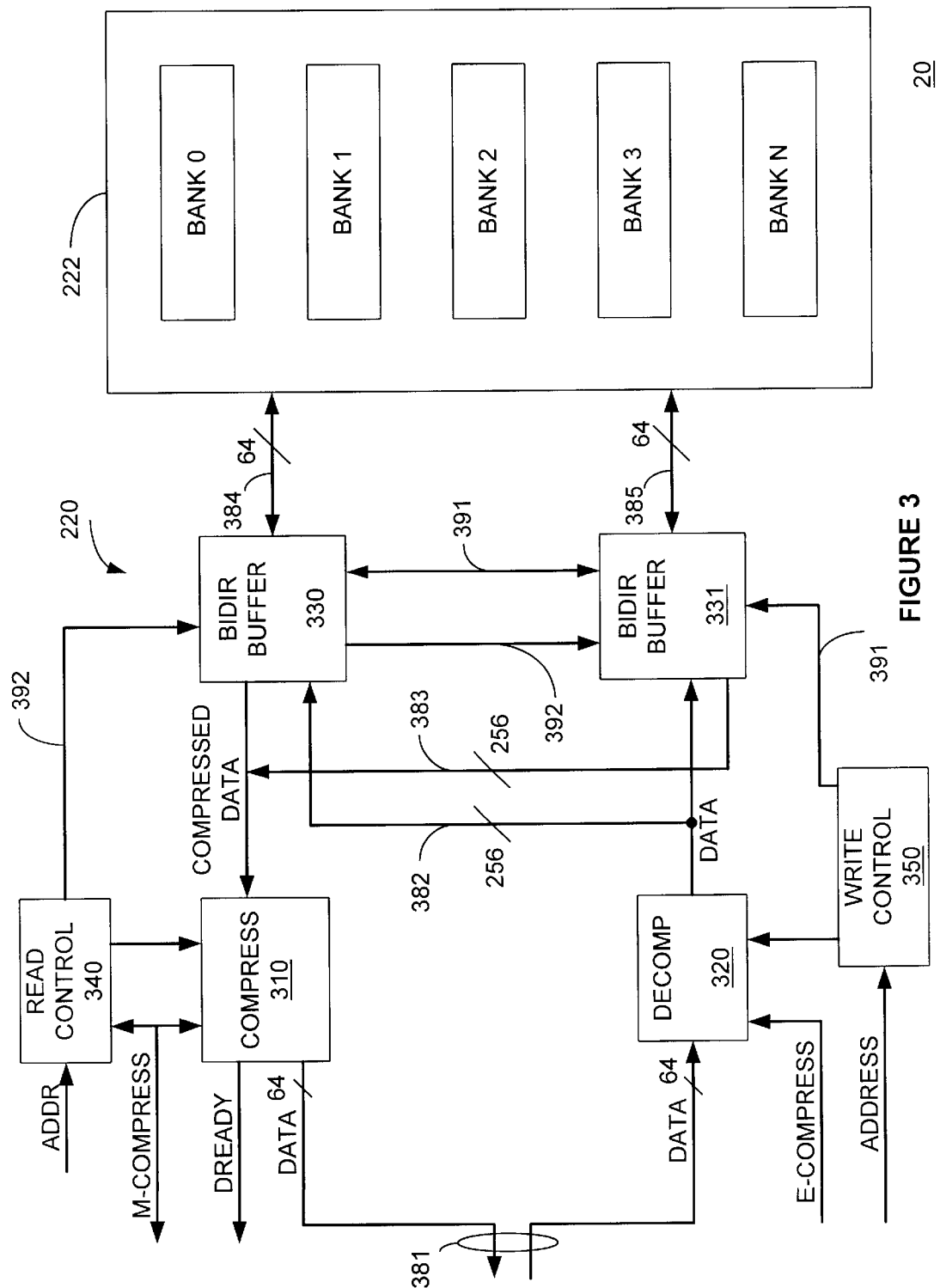
FIG. 3 illustrates, in block diagram form, a memory of FIG. 1 in greater detail.

FIG. 3 illustrates the memory 20 in greater detail. Specifically, the control module 220 includes a compress module 310, a decompress module 320, a bi-directional buffer 330, a bi-directional buffer 331, a read control module 340, and write control module 350. Furthermore, the memory array 222 has a plurality of banks of memory. Access of memory 20 in accordance with the present invention is described with reference to FIGS. 4 and 5.

In operation, the bi-directional buffers 330 and 331 of FIG. 3 can be associated with either a read data path, or a Write data path. For example, the bi-directional buffer 331 can receive data from the decompress module 320 for the memory array 222, or it can receive uncompressed data from the memory array 222 to the compress module 310. Likewise, the bi-directional buffer 330 can either receive decompressed data from the decompress module 320 for the memory array 222, or it can receive uncompressed data from the memory array 222 for the compress module 310.

Figure 4:
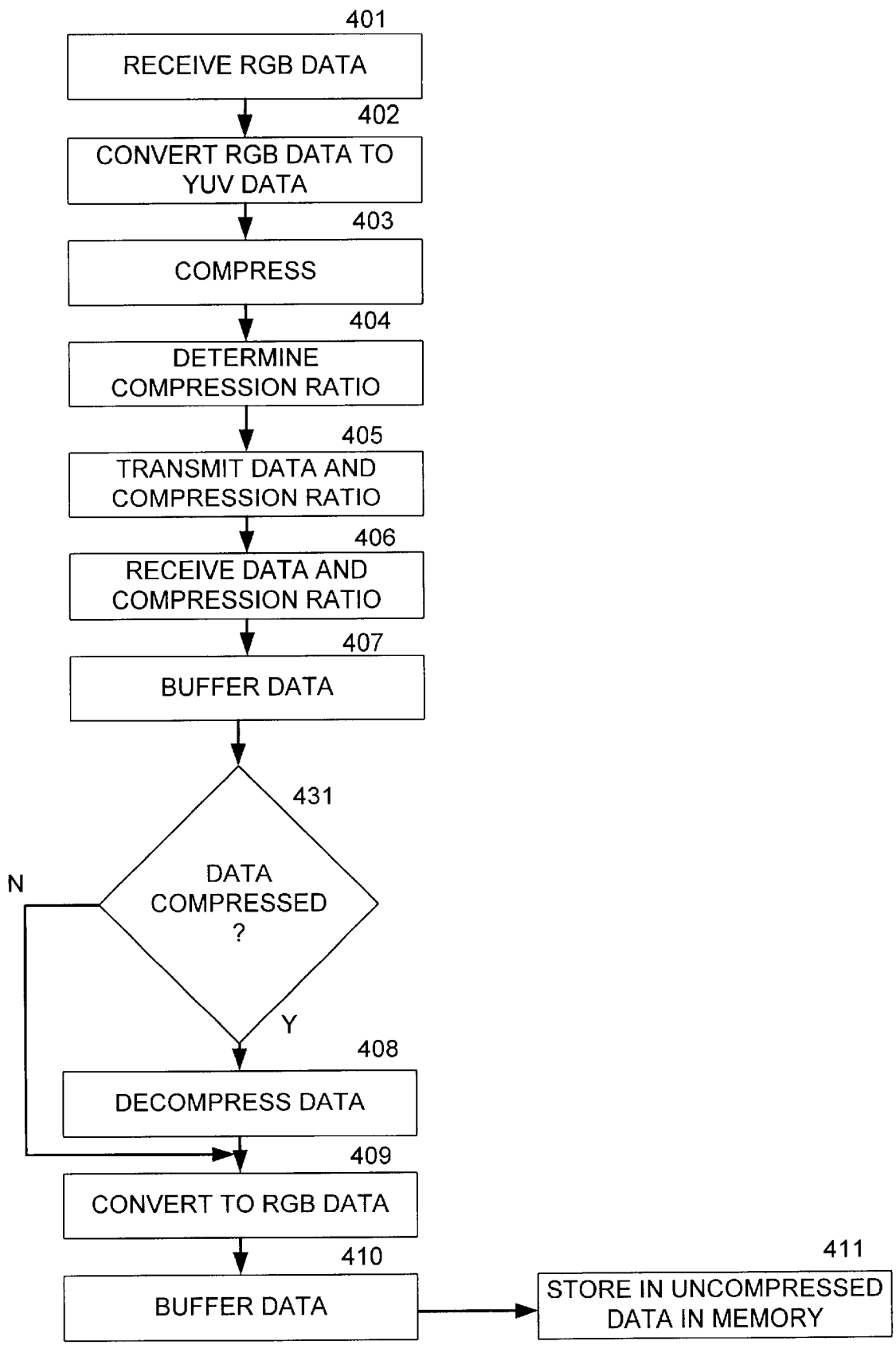
FIG. 4 illustrates, in flow diagram form, a method in accordance with the present invention.

FIG. 4 illustrates a method associated with a write cycle in accordance with the present invention. The method will be discussed with reference to FIGS. 1–3 for illustrative purposes. At step 401, RGB data is received from the video client of a graphics engine, for example in FIG. 2 the data is received at the compressed portion 214. Note that the actual data can be received by the memory controller 216 of FIG. 2 which would then route the data to the compression portion 214.

At step 402, the RGB data is converted to YUV data as previously discussed.

At step 403, compression of the YUV video data is performed. Any standard or proprietary compression protocol may be used in accordance with the present invention.

At step 404, a determination is made as to what compression ratio used. Generally, a compression routine capable of providing the highest compression ratio will be used. However, other factors such as speed of compression and the available band width can be considered as well. In a specific embodiment, the, compression ratio will be N:1, where N is equal to one of 1, 2, 4, 8, and 16. In another embodiment, only four compression ratios are available N equals one of 1, 4, 8, and 16.

At step 405, the compressed data and the compression ratio are transmitted to the memory 20. The R/W signal will be asserted to indicate that the current access is a write. For the specific embodiment where five possible compression ratios exist, at least three bits of data will be transmitted to provide the compression information to the Memory 20. In the Figures, the E_COMPRESS is transmitted over a bus, which is at least three bits wide to indicated one of five compression options, or at least two bits wide to indicate one of four compression options. In other implementations, the E_COMPRESS signal can be transmitted serially over a single node. In other embodiments, the transmitted compressed data may contain specific codes or indicators, such as header information, specifying the presence of compressed data.

At step 406, the compression information is received at a port associated with the embedded memory 20.

At step 407, the received data is buffered. Note that the buffer used to receive the transmitted data is not specifically illustrated in FIG. 3. However, the buffer will receive a predetermined number of transmitted words needed for subsequent the compression steps. In one embodiment, eight double words (512 bytes) are received by the buffer. In addition, the compressed data can be stored to a register.

At step 431, a determination is made whether the received data is compressed. In one embodiment, this determination is based upon an evaluation of the value of the E_COMPRESS signal received and/or stored in a register. When it is determined that data is not compressed, the flow proceeds from step 431 to step 409. When it is determined that the data is compressed the flow proceeds to step 408.

At step 408, the received data is decompressed. The decompression algorithm used will be based upon the transmitted compression ratio information.

At step 409, the decompressed data is converted from YUV data back RGB data.

At step 410 the compressed data is buffered for storage.

At step 411, individual portions of the buffered data, such as bytes, words, or double words, are stored within the memory 222. By allowing for data to be stored in multiple banks of memory 222, the data can be stored in a more time efficient manner. Note that the data stored within in memory 222, which represents video data, is stored in an uncompressed form. By storing the video data in an uncompressed manner, it is not necessary to maintain overhead information pertaining to the storage of compressed memory, thereby simplifying subsequent read accesses of the data.

It will be appreciated by one skilled in the art, the method of FIG. 4 illustrates a specific embodiment of writing video data in accordance with the present invention. As such, the steps described do not necessarily represent a specific order specific order of the specific steps, and may in fact described optional steps. For example, steps 409 and 410, as well as other steps, may be reversed in a different implementation without affecting intent of the present invention.

Figure 5:
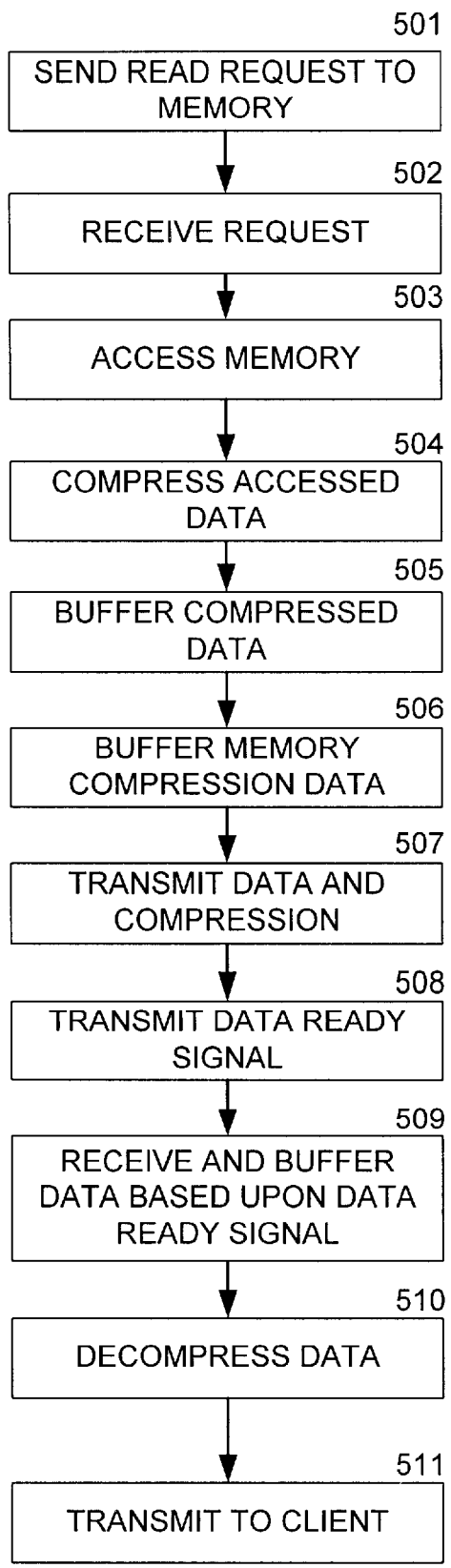
FIG. 5 illustrates, in flow diagram form, another method in accordance with the present invention.

FIG. 5 illustrates a method associated with a read cycle in accordance with present invention. At step 501, a read request to access memory 20 is generated by the graphics processor 10.

At step 502, the read request is received at the memory 20. Note that the read request can be received directly by control logic of memory 20, or may be buffered.

At step 503, the memory array 222 is accessed to retrieve the requested data. For example, in FIG. 3 read control module 340 controls and accesses the memory 222 and the bi-directional buffer 330 to retrieve data from the memory 222. As part of the access the data is buffered into the bi-directional buffer 330.

At step 504, the accessed data is compressed. Based upon the characteristics of the received data, a compression ratio will be determined. Note that at the compress step 504, the data received can be converted from RGB Type video to YUV Type video.

At step 505, the compressed data is buffered at an output buffer, which is not illustrated in FIG. 3. The output buffer holds all of the compressed data in preparation for transmitting the data to the graphics processor 10. Note that the output buffer may of a specific type, such as a FIFO (First In First Out memory).

At step 506, the compression ratio information is also buffered for transmission to the graphics processor 10.

At step 507, the memory 20 acquires the bus, and transmits the compressed data and the compression information to the graphics processor 10.

At step 508, a data ready signal (DREADY) is also transmitted to the graphics processor 10. The data ready signal indicates that the compressed data has been buffered and is ready for transmission. This data ready signal is received by the graphics processor and initiates the data is available. The data ready signal is used during read cycles when the compression time of the compress step 705 is unknown. The use of the data ready signal allows the data to be transferred to the graphics processor as soon as the data has been compressed. In an alternate embodiment, all data transfers will occur at a predetermined worst case amount of time, without regards to the compression ratio.

At step 509, the graphics processor 10 receives and buffers the compressed data based upon the data ready signal.

At step 510, the data is decompressed, including conversion to RGB data as appropriate.

At step 511, the decompressed data is provided to the requesting client.

It will be appreciated by one skilled in the art, the method of FIG. 5 illustrates a specific embodiment of practicing the present invention. As such, the steps described do not necessarily represent a specific order specific order of the specific steps, and may in fact described optional steps.

Figure 6:
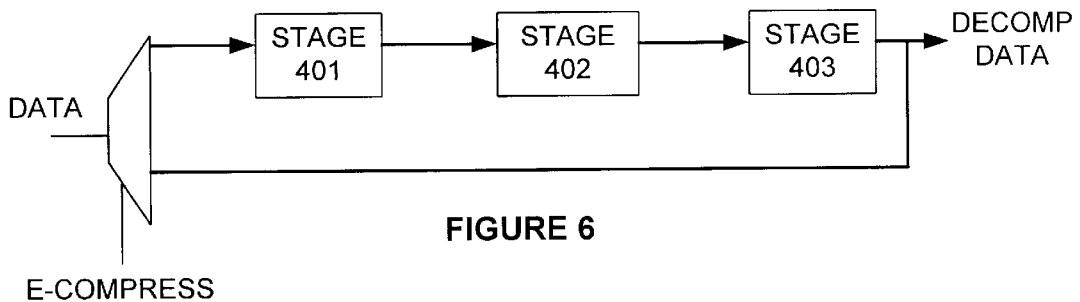
FIG. 6 illustrates, in block diagram form, a specific embodiment of a portion of FIG. 3.
Figure 7:
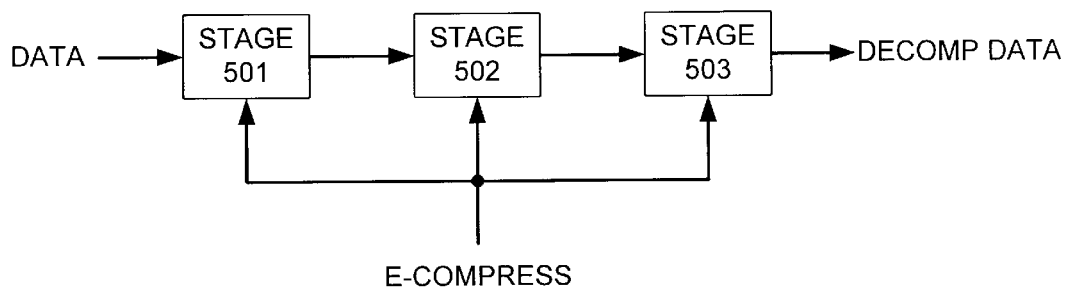
FIG. 7 illustrates, in block diagram form, a specific embodiment of a portion of FIG. 3.

FIGS. 6 and 7 illustrate specific embodiments of the decompression module 320. In the embodiment illustrated in FIG. 6, all stages of the decompression pipeline are by-passed based upon the E_COMPRESS signal, or other control signals from the module 320. This allows uncompressed data to be quickly forwarded to the memory array 222. In the embodiment illustrated in FIG. 7, the E_COMPRESS signal is received by individual pipe stages of the decompression pipeline, and the data flow through each stage of the pipe. By passing data through each stage regardless of the final compression ratio, the data is transferred to the memory array 222 in a predetermined amount of time. The specific embodiment of FIG. 7 allows for simplified write logic.

Note that the compress module 310, can be implemented in embodiments similar to those of FIGS. 6 and 7, however because the graphics processor is waiting for data it is generally desirable to use an implementation analogous to that of FIG. 6 to transmit the data as soon as possible.

It should be understood that the specific steps indicated in the methods herein, and/or the functions of specific modules herein, may be implemented in hardware and/or software. For example, a specific step or function may be performed using software and/or firmware executed on one or more data processors.

In general, a system for accessing data may include a specific or generic data processor and memory in addition to, or in lieu of, any specific data processors and memories illustrated. Such a data processor(s) can be a single processing device or a plurality of processing devices. Such a processing device may be a microprocessor, microcontroller, digital processor, microcomputer, a portion of a central processing unit, a state machine, logic circuitry, and/or any device that manipulates the signal and/or data.

The manipulation of these signals and/or data is generally based upon operational instructions represented in a memory. The memory may be a single memory device or a plurality of memory devices. Such a memory device may be a read only memory, a random access memory, a floppy disk memory, magnetic tape memory, erasable memory, a portion of a system memory, a transmitted signal, and/or any element that provides instructions to the data processor. Note that when the data processor implements one or more of its functions, it may do so where the device providing the corresponding operational instructions is embedded within the circuitry comprising a state machine and/or other logic circuitry.

Figure 8:
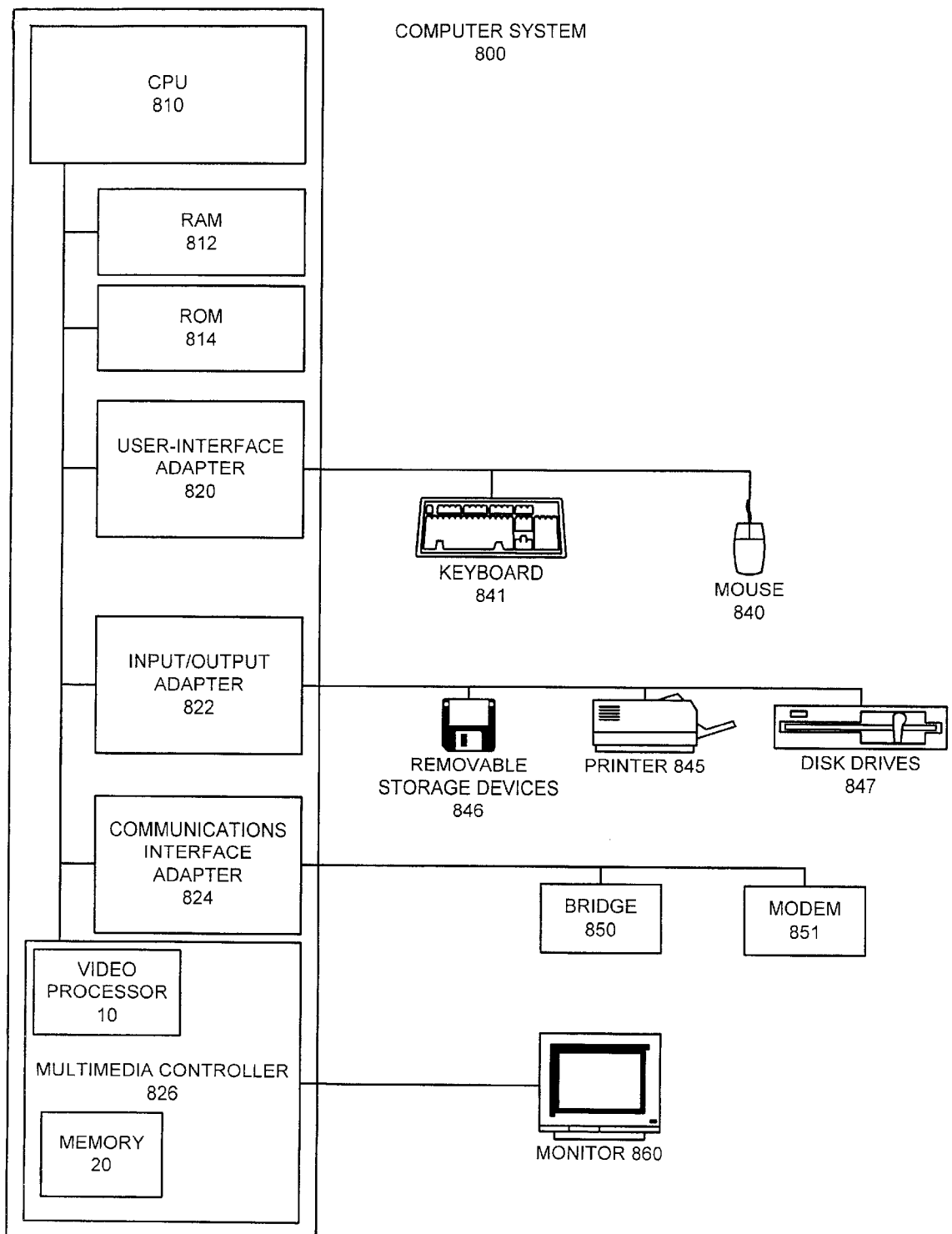
FIG. 8 illustrates, in block diagram form, a system capable of incorporating the system of FIG. 1.

FIG. 8 illustrates, in block diagram form, a data processor in the form of a computer system 800. The computer system 800 is illustrated to include a central processing unit 810, which may be a conventional proprietary data processor, memory including random access memory 812, read only memory 814, and input output adapter 822, a user interface adapter 820, a communications interface adapter 824, and a multimedia controller 826.

The input output (I/O) adapter 826 is further connected to, and controls, disk drives 847, printer 845, removable storage devices 846, as well as other standard and proprietary I/O devices.

The user interface adapter 820 can be considered to be a specialized I/O adapter. The adapter 820 is illustrated to be connected to a mouse 840, and a keyboard 841. In addition, the user interface adapter 820 may be connected to other devices capable of providing various types of user control, such as touch screen devices.

The communications interface adapter 824 is connected to a bridge 850 such as is associated with a local or a wide area network, and a modem 851. By connecting the system bus 802 to various communication devices, external access to information can be obtained.

The multimedia controller 826 will generally include the video processor 10 and memory 20 of FIG. 1. In general, the multimedia controller 826 is capable of displaying images upon the monitor 860, as well as providing audio to external components (not illustrated). Generally, the system and methods described herein can be implemented into the system 800.

One of ordinary skill in the art will recognize that the present invention has been described with reference to specific embodiments, and that other embodiments of the present invention are anticipated. For example, the control functions described with reference to FIG. 3 can be distributed among the compress portion 310 and various other components of memory 20. Furthermore, the steps of converting the RGB data to YUV data and back again can be eliminated. It should now be appreciated that the present invention provides for efficient transfer of video data between a graphics processor and its memory.

I claim:

1. An embedded memory system comprising:

a data input node;

a control input node;

a decompression module having a data input coupled to the data input node, a control node coupled to the control input node, and an output, the decompression module to decompress received data based on a received compression indication;

a memory array having a data input coupled to the output of the decompression module, and a data output;

a compression module having a data input coupled to the data output of the memory array, a data output; and a data output node coupled to the data output of the compression module, wherein the decompression module further includes:

a decompression controller having an input coupled to the control input node, a first output, and a second output;

a first decompress portion having an enable input coupled to the first output, and an output of the decompression controller, wherein the first decompress portion is for decompression data at a first decompression ratio; and a second decompress portion having an enable input coupled to the second output of the decompression controller, and an output, wherein the second decompress portion is for decompression data at a second decompression ratio different than the first decompression ratio.

2. The embedded memory system of claim 1 further including a data buffer coupled to the output of the first decompress portion and the output of the second decompress portion.

3. An embedded memory system comprising:

a data input node;

a control input node;

a decompression module having a data input coupled to the data input node, a control node coupled to the control input node, and an output, the decompression module to decompress received data;

a memory array having a data input coupled to the output of the decompression module, and a data output;

a compression module having a data input coupled to the data output of the memory array, a data output; and a data output node coupled to the data output of the compression module, wherein the decompression module further includes:

a decompression controller having an input coupled to the control input node, a first output, and a second output;

a first decompress portion having an enable input coupled to the first output, and an output of the decompression controller, wherein the first decompress portion is for decompression data at a first decompression ratio; and a second decompress portion having an enable input coupled to the second output of the decompression controller, and an output, wherein the second decompress portion is for decompression data at a second decompression ratio different than the first decompression ratio.

4. The embedded memory system of claim 3 further including a data buffer coupled to the output of the first decompress portion and the output of the second decompress portion.

* * * * *